United States Patent
D'Amora

(10) Patent No.: US 7,656,401 B2
(45) Date of Patent: Feb. 2, 2010

(54) TECHNIQUES FOR REPRESENTING 3D SCENES USING FIXED POINT DATA

(75) Inventor: Bruce David D'Amora, New Milford, CT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/101,204

(22) Filed: Apr. 11, 2008

(65) Prior Publication Data

US 2008/0186309 A1 Aug. 7, 2008

Related U.S. Application Data

(63) Continuation of application No. 10/719,304, filed on Nov. 21, 2003, now Pat. No. 7,432,925.

(51) Int. Cl.
  G06T 15/00 (2006.01)
(52) U.S. Cl. ............... 345/419; 345/427; 345/622; 345/619
(58) Field of Classification Search ........... 345/473
  See application file for complete search history.

(56) References Cited

U.S. PATENT DOCUMENTS

| | | | | | |
|---|---|---|---|---|---|
| 4,707,738 | A | * | 11/1987 | Ferre et al. | 348/400.1 |
| 5,933,146 | A | * | 8/1999 | Wrigley | 345/420 |
| 5,941,938 | A | * | 8/1999 | Thayer | 708/490 |
| 6,292,194 | B1 | * | 9/2001 | Powell, III | 345/582 |
| 6,314,452 | B1 | * | 11/2001 | Dekel et al. | 709/203 |
| 6,377,257 | B1 | * | 4/2002 | Borrel et al. | 345/419 |
| 6,532,012 | B2 | * | 3/2003 | Deering | 345/423 |
| 6,556,206 | B1 | * | 4/2003 | Benson et al. | 345/473 |
| 6,556,207 | B1 | * | 4/2003 | Julien | 345/473 |
| 6,573,890 | B1 | * | 6/2003 | Lengyel | 345/419 |
| 6,664,975 | B1 | * | 12/2003 | Hatch | 345/622 |
| 6,684,255 | B1 | * | 1/2004 | Martin | 709/231 |

(Continued)

OTHER PUBLICATIONS

Garcia et al., Efficient Generation of Object Hierarchies from 3D Scenes, pp. 1359-1364, IEEE International Conference on Robotics and Automation, May 1999.*

(Continued)

*Primary Examiner*—M Good Johnson
(74) *Attorney, Agent, or Firm*—Ryan, Mason & Lewis, LLP

(57) ABSTRACT

A quantization transform, corresponding to a geometric object, is determined. The geometric object represents at least a portion of an object in a three-dimensional scene. The quantization transform is suitable for converting a floating point space to a fixed point space, where the floating point space contains floating point data corresponding to the geometric object. The quantization transform is used to convert floating point data to fixed point data. The floating point data is typically vertices corresponding to the geometric object. Additionally, a quantization transform corresponding to a geometric object is determined. The geometric object represents at least a portion of the three-dimensional scene. The quantization transform is suitable for converting a floating point space to a fixed point space, and the fixed point space contains one or more fixed point data corresponding to the geometric object. The floating point space defines at least the portion of the three-dimensional scene. At least the quantization transform is applied to the one or more fixed point data.

20 Claims, 7 Drawing Sheets

U.S. PATENT DOCUMENTS

| | | | |
|---|---|---|---|
| 6,693,645 B2* | 2/2004 | Bourges-Sevenier | 345/619 |
| 6,999,098 B2* | 2/2006 | Leather | 345/600 |
| 7,103,621 B2* | 9/2006 | Rodriguez et al. | 708/204 |
| 7,355,603 B2* | 4/2008 | Donovan et al. | 345/582 |
| 2002/0050992 A1* | 5/2002 | Deering | 345/423 |
| 2005/0062762 A1* | 3/2005 | Wang et al. | 345/643 |

OTHER PUBLICATIONS

D'Amora et al., "Pervasive 3D Viewing for Product Data Management," IEEE Computer Society, pp. 14-19 (Mar./Apr. 2003).

D'Amora et al , "Pervasive 3D Viewing for Product Data Management," IEEE Computer Society, pp. 14-19 (Mar./Apr. 2003).

* cited by examiner

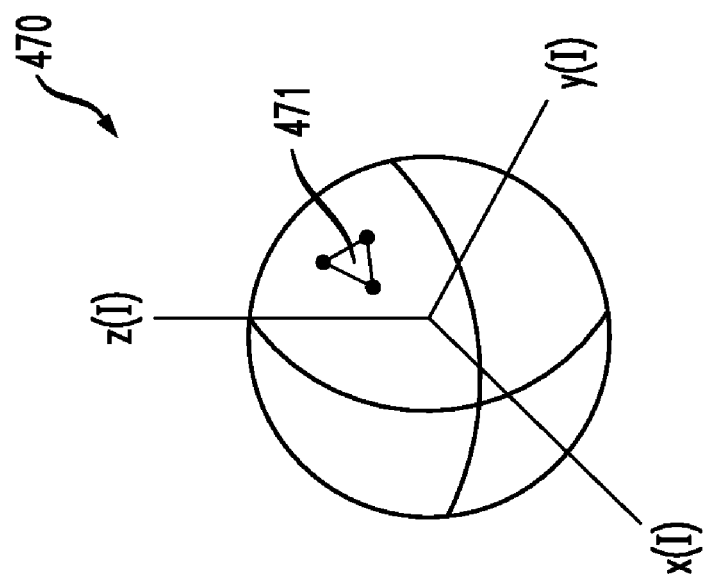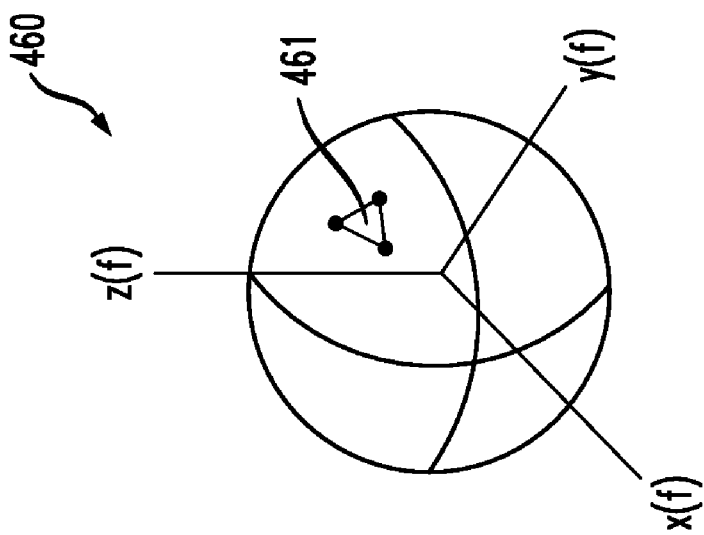
FIG. 4B

TECHNIQUES FOR REPRESENTING 3D SCENES USING FIXED POINT DATA

CROSS REFERENCE TO RELATED APPLICATIONS

This application is a continuation of U.S. patent application Ser. No. 10/719,304, filed on Nov. 21, 2003, now U.S. Pat. No. 7,432,925 incorporated by reference herein.

FIELD OF THE INVENTION

The present invention relates to digital imaging and, more particularly, relates to processing and rendering digital images.

BACKGROUND OF THE INVENTION

Applications targeted at the creation or display of three-dimensional (3D) digital images (called "3D scenes" herein) typically employ some form of graphics database to store not only the 3D data that represents the geometry and appearance of objects in the 3D scene, but also structures that describe the hierarchical relationship and instances of the objects comprising the 3D scene. An example of this is a Computer-Aided Design (CAD) application that is used to draw and display an automotive assembly. The graphics database used by such an application may contain the data that represents a wheel of the automobile as well as a structure that is used by the application to determine how many times the wheel data is referenced and at which position in the scene it should be positioned. One type of graphics database is a scene graph.

A scene graph can be implemented as a tree structure, such as a directed acyclical graph. The scene graph contains specific information to accurately represent the 3D scene. First, the scene graph contains information that describes each unique geometric object contained in the scene. This is often a set of triangles, each triangle being composed of three vertices, with each vertex being represented by an x,y,z coordinate value. This value is typically a floating point data type because the content creation authoring tools regardless of market segment generate data in the floating point domain. The scene graph also contains information about the appearance of each geometric object when it is tendered. For example, the geometric object may be rendered as a filled or wireframe geometric object; the geometric object may rendered as being smooth or flat shaded; the geometric object may rendered as being lit or non-lit; or the geometric object may be rendered as having an image mapped onto it (e.g., texture mapped).

In addition to the data required to represent specific geometry and appearance of geometric objects corresponding to objects in the scene, the scene graph also contains information about the instantiation, relative size, position, and orientation of these geometric objects. Data for a single geometric object may be specified once but instantiated many times in different locations, sizes, and orientations. This is accomplished by one or more transform nodes in the scene graph. Transform nodes can store information such as x,y,z scale factor, x,y,z translation, and x,y,z angle of rotation. Each transform node in the scene graph can have one or more child nodes that can refer to information about the geometric object to be rendered or to specify additional transformations. Child nodes generally are other transform nodes or shape nodes. Transform nodes specify additional transformation and shape nodes specify appearance and geometric data. Shape nodes are usually leaf nodes in the scene graph, i.e., they have no children of their own. Whenever the scene graph is traversed by an application, a transform node is used to compute a transformation matrix, which is applied to geometric data specified by child nodes attached to the transform node to properly render the geometric objects represented by the child nodes in a drawing window on a display. Rendering includes positioning, sizing, orienting, and coloring the geometric objects.

Scene graphs, having a combination of geometric data, appearance attributes, transformations, and hierarchical relationships, are typically saved in file formats that an application can access to reconstruct or create a 3D scene. Furthermore, it is common for applications to provide various input and output filters to convert one file format into another file format so that 3D scenes can be shared between different applications.

While scene graphs and file formats having scene graphs allow 3D scenes to be created, stored, and tendered, there are certain problems while creating, storing and rendering 3D scenes. Thus, there is a need to fix these problems.

SUMMARY OF THE INVENTION

Exemplary aspects of the present invention provide techniques for representing 3D scenes with fixed point data.

In an exemplary aspect of the invention, typically performed on a server, a quantization transform, corresponding to a geometric object, is determined. The geometric object represents at least a portion of a three-dimensional scene. The quantization transform is suitable for converting a floating point space to a fixed point space, where the floating point space contains floating point data corresponding to the geometric object The quantization transform is used to convert floating point data to fixed point data. The floating point data is typically vertices corresponding to the geometric object.

Typically, the geometric object represents a portion of an object in the three-dimensional scene. Additionally, the geometric object can be, for instance, a triangle having three vertices, a point, or a line.

In another exemplary aspect of the invention, typically performed on a client, a quantization transform corresponding to a geometric object is determined. The geometric object represents at least a portion of the three-dimensional scene. The quantization transform is suitable for converting a floating point space to a fixed point space, and the fixed point space contains one or more fixed point data corresponding to the geometric object. Further, the floating point space defines at least the portion of the three-dimensional scene. At least the quantization transform is applied to the one or more fixed point data. Typically, additional transforms, such as a previously determined inverse quantization transform and a ModelView transform comprising one or more of scale, rotate, and translate data are concatenated to the quantization transform and applied to the one or more fixed point data.

A more complete understanding of the present invention, as well as further features and advantages of the present invention, will be obtained by reference to the following detailed description and drawings.

BRIEF DESCRIPTION OF THE DRAWINGS

FIG. 4B illustrates mapping a floating point space to a fixed point space, as performed in FIG. 4A;

DETAILED DESCRIPTION OF PREFERRED EMBODIMENTS

Figure 1:
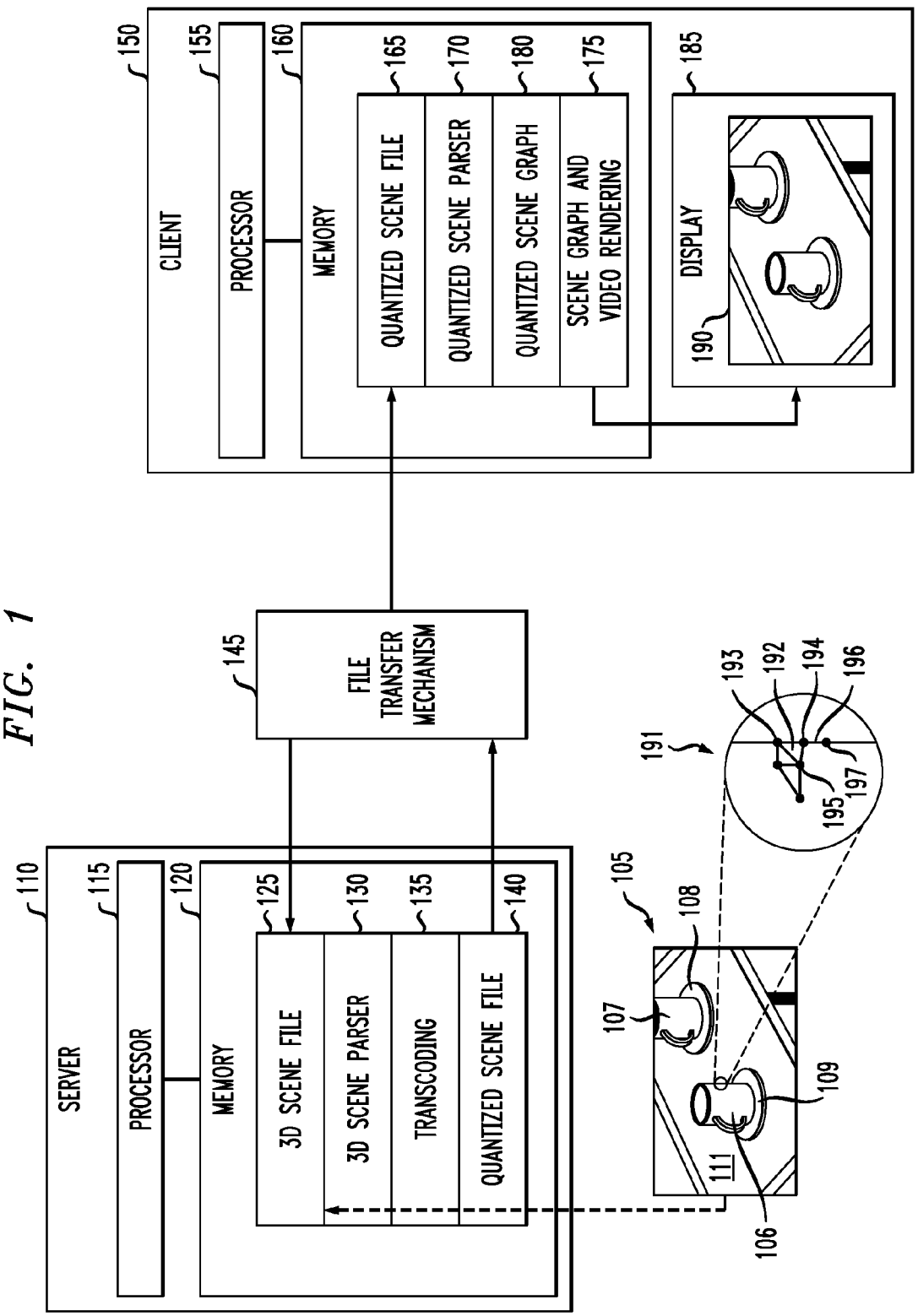
FIG. 1 is a block diagram of a server and client communicating through a network, in accordance with an exemplary embodiment of the present invention.

Conventional graphics databases, implemented through techniques such as scene graphs, are targeted for Personal Computer (PC), workstations or server platforms. These systems have full floating point support and are capable of very large memory footprints. In contrast, low power systems such as those required to support Personal Digital Assistants (PDAs) and cellular phones have low frequency processors without floating point support and generally have maximum memory of 32 or 64 MegaByte (MB) Random Access Memory (RAM). A key requirement for these devices is to maximize battery life by minimizing power consumption. Although these platforms are not ideal for desktop or workstation 3D content creation, CAD, or video game applications, their mobility is appealing.

In order to take advantage of this mobility, traditional applications need to minimize their compute and memory requirements The amount of floating point data generally stored in graphics databases (such as scene graphs) makes this problematic. Scenes can vary in complexity, but generally video games, which are one of the most in-demand applications for low power platforms, are composed of many geometric and image objects, some of which will generally constantly change color, position, size and orientation. Fox example, a typical game scene may contain many stationary objects such as trees, mountains, lakes, and fields, but only a few dynamic objects such as a per son or persons walking through the field. This implies the storage, recall, and processing of a continuous stream of floating point data. This is true because typical 3D content creation occurs using floating point data. Processor and memory constrained devices, such as PDAs and cellular phones, typically emulate operations on floating point data. Emulation of floating point operations is very slow. This problem is further complicated by the need to support online gaming, which uses game servers to serve a variety of devices all participating in an online game simultaneously, with each device have different compute and storage capability.

Thus, processor and memory constrained devices are generally not suitable for 3D scene storage and rendering.

Exemplary aspects of the present invention provide solutions for these problems by converting data for certain 3D scene information from floating point data to fixed point data. A quantized scene file is created that has fixed point data for certain 3D information. The quantized scene file additionally has cumulative inverse transforms, which are used during rendering on a processor and memory constrained device. Because much of the 3D scene information is fixed point data, the floating point processing performed by a client, such as a PDA or cellular phone, is kept to a minimum so performance will be maximized. Additionally, fixed point data can be made to take less space than floating point data, so the quantized scene file can be smaller than an equivalent file having floating point data.

Before proceeding with more description, some exemplary definitions are given as an aid to understanding the terms used herein.

Scene graph: a tree structure used to represent a 2D or 3D graphics scene by storing references to object attributes and hierarchical relationships in the nodes of the tree.

Transcoding: the process of converting one data format into another data format.

Quantization: the process of mapping one numerical domain to another domain.

ModelView (MV) Transform: a transform that combines a modeling transform and a viewing transform into a single transform, typically a 4×4 or 3×3 matrix, that can be applied to a set of 3D or two-dimensional (2D) data to size, orient, and position an object represented by the data correctly on a display surface.

Directed Acyclical graph: a tree with no cycles and with edges connecting between the nodes that can only be traversed in one direction.

API: Application Programming Interface.

IFS: Indexed Face Sets, which are a set of indices used to select from a list of vertices the three corners of a triangle to be rendered.

Flat Shaded: the process of filling each pixel in an area on a display surface with a single color attribute.

Smooth Shaded: the process of interpolating color intensities across pixels in an area on a display surface Gouraud shading is an example of smooth shading.

Texture mapped: the process of mapping a one-dimensional (1D), 2D, or 3D image onto a bounded area on a display surface.

Fixed point data: whole numbers. These are typically represented as unsigned integers, but could be signed or unsigned integers of any length.

Turning now to FIG. 1, a server 110 is shown interacting with a client 150 through file transfer mechanism 145. Server 110 comprises a processor 115 coupled to a a memory 120 Memory 120 comprises a 3D scene file 125, a 3D scene parser 130, a transcoding module 135, and a quantized scene file 140. Client 150 comprises a processor 155 coupled to a memory 160, which is coupled to display 185. Memory 160 comprises a quantized scene file 165, a quantized scene parser 170, a scene graph and video rendering module 175, and a quantized scene graph 180. Display 185 shows a representation 190 of a 3D scene.

File transfer mechanism 145 will generally be some type of network, such as a wired, wireless, or infrared network However, file transfer mechanism 145 could be a Compact Disk (CD), Digital Versatile Disk (DVD), memory stick, or other portable memory.

An exemplary embodiment of the present invention involves two major phases: one phase is performed either online or offline on server 110; the other phase executes on a PDA or other handheld, such as client 150. The server phase inputs a 3D scene 105 typically formatted (e.g., as 3D scene file 125) for a desktop or other high performance workstation and transcodes it to produce a quantized scene file 140 that is more efficiently stored and processed on a low-performance handheld device such as a PDA or cellphone, shown in FIG. 1 as client 150. Note that the quantized 3D scene file 125 may be transferred from server 110 to client 150 via file transfer mechanism 145, such as the Internet, serial cables, a Universal Serial Bus (USB), an infrared connection, or other standard means of data transfer typically used with handheld or embedded devices.

In this example, 3D scene 105 has been converted by a process (not shown) to 3D scene file 125. The 3D scene 105 has cups 106, 107 sitting on plates 109, 108, respectively. The plates 109, 108 sit on tray 111. Cups 106, 107, plates 109, 108, and table 111 are objects in the 3D scene 105. As is known in the art, surfaces of the objects 106 through 109 and 111 can be represented by geometric objects, such as lines, points, and triangles having three vertices.

For instance, reference 191 shows two geometric objects 192 and 196 Geometric object 192 is a triangle defined by vertices 193, 194, and 195. Geometric object 196 is a line defined by vertices 194 and 195. The 3D scene file 125 will have some representation of the geometric objects 192, 196, and this representation will typically have additional information associated with the geometric objects 192, 196, such as the appearance of the geometric objects 192, 196. For instance, colors or textures could be associated with the geometric objects 192, 196.

The server phase comprises a 3D scene parser 130 that is used to parse the input 3D scene file 125 and a transcoding module 135 that performs optimization including quantization of floating point data to fixed point data to produce a quantized scene file 140. Typically, a 3D scene file 125 contains information about a number of geometric objects (not shown in FIG. 1), where the geometric objects correspond to objects in 3D scene 105 For instance, a geometric object could correspond to cup 106 or a portion of cup 106. The geometric objects have associated floating point data (not shown in FIG. 1). An exemplary aspect of the present invention maps the floating point data to fixed point data (also not shown in FIG. 1). A quantization transform (not shown) is determined, e.g., by the transcoding module 135, that maps the floating point data to fixed point data. As described above, the floating point data for a geometric object might comprise data for vertices of a triangle. The vertex data is then converted from floating point data to fixed point data. The quantization transform can be determined, in an exemplary embodiment, by using a bounding sphere that contains all of the vertices in a floating point space. The quantization transform is determined to map the extents of the bounding sphere to an integer space. The quantization transform is then applied, e.g., by the transcoding module 135, to the vertex data.

Consequently, the transcoding module 135 creates quantized scene file 140. Additionally, other floating point data associated with a geometric object, such as colors, normals, and texture coordinates, may be converted to fixed point data.

The client phase comprises the quantized scene parser 170, which parses the quantized scene file 165, and creates the quantized scene graph 180, and the scene graph and video rendering module 175, renders it. In this example, quantized scene files 140 and 165 are assumed to be the same file. It should be noted that the 3D scene file 125 will typically be American Standard Code for Information Exchange (ASCII), while the quantized scene file 165 can be binary to save space on the client 150. Neither ASCII nor binary scene files are requirements and other types of formats may be used for scene files. Consequently, the quantized scene file 140 might be stored in a non-binary format and converted to a binary format as quantized scene file 165. Although not shown in FIG. 1, the memory 120 of server 110 could contain a parsed 3D scene graph and the memory 160 of client 150 could contain a parsed quantized scene graph.

The display 185 shows a representation 190 of 3D scene 105. Because the representation 190 is generated from fixed point data and not floating point data, some loss in precision results. However, the loss in precision will likely not be noticeable by the human eye, particularly on the typically small screens used in a client 150.

It should be noted that processors 115 and 155 can be distributed or singular, although processor 155 will typically be singular. It should also be noted that memories 120, 160 can be distributed or singular. Exemplary embodiments of the present invention described herein may be implemented as an article of manufacture comprising a machine-readable medium, as part of memory 120 or 160 for example, containing one or more programs that when executed implement embodiments of the present invention. For instance, the machine-readable medium may contain a program configured to perform the steps taken by 3D scene parser 130 and transcoding module 135. The machine-readable medium may be, for instance, a recordable medium such as a hard drive, an optical or magnetic disk, an electronic memory, of other storage device.

Figure 2:
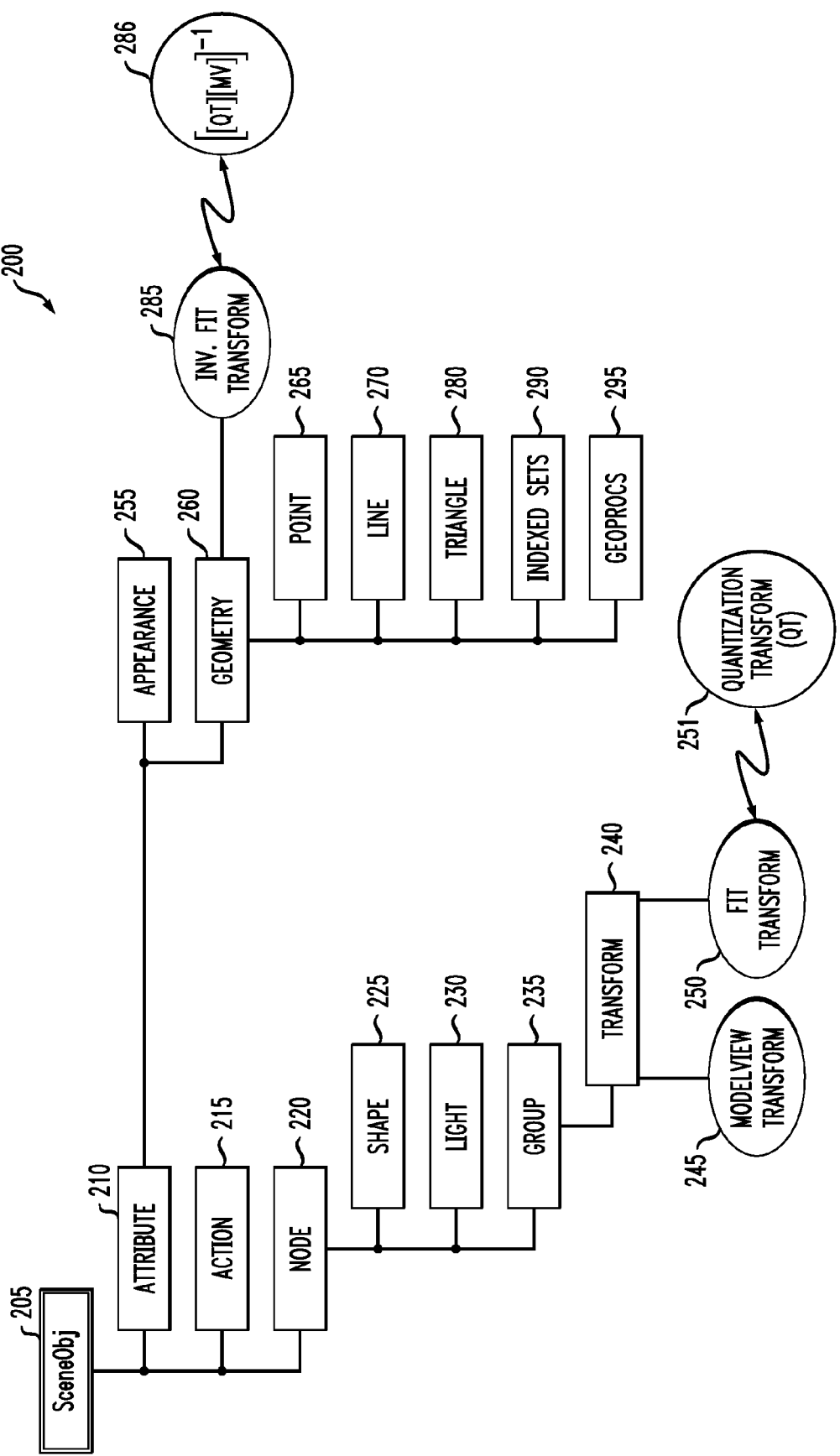
FIG. 2 illustrates a hierarchical representation of a scene.

A memory resident scene graph 200 node class hierarchy can be described as shown in FIG. 2. The scene graph 200 shown represents a portion of a quantized scene graph 180. In this example, the items 205 though 295 are classes, from which objects (in an object-oriented programming sense) may be instantiated. However, some classes can be abstract, such as SceneObj 205 in this example, which forms a basis for other classes. Thus, object-oriented programming is assumed to be used to define memory resident scene graph 200, but other types of programming may be used. In the following disclosure, the terms "object" and "class" will be used interchangeably, although it is to be understood that an "object" is instantiated from a "class."

The nodes in scene graph 200 comprise various types of nodes that generally fall into two categories: internal nodes and leaf nodes. Geometric data is typically stored at a leaf node. Attribute classes 210 can be subclassed as Appearance classes 255 and Geometry classes 260. Appearance classes 255 generally contain color or texture information while Geometry classes 260 contain vertex, normal, and triangle data used for describing the structure of the geometric object. It should be noted that a geometry object is an object that represents a part of a 3D image, such as the surface of cup 106 represented by geometric object 192 of FIG. 1. By contrast, a Geometry object 260 is an object in an object-oriented programming system and is defined to contain information defining a geometric object.

Shape nodes 225 generally contain Appearance objects 255 and Geometry objects 260. Shape nodes 225 in the scene graph 200 contain references to Geometry objects 260 and Appearance objects 255. These references are "has a" relationships in the sense that a Shape node 225 "has a" pointer to a Geometry object 260 and a pointer to an Appearance object 255.

Action 215 is a class used to describe procedural behaviors that can be applied to nodes in the scene graph during traversal, e.g. Animation. Light 230 is used to describe the lighting model and parameters and is added to the scene graph as a leaf node. Group 235 is an abstract class from which Transform 240 is subclassed. In an exemplary implementation of this invention, geometric data and attributes are stored in leaf nodes such as Shape 225, Geometry 260, and Appearance 255 shown in FIG. 2. Geometry 260 comprises Point 265, Line 270, Triangle 280, Indexed Sets 290, and Geoprocs 295.

Internal nodes such as Group 235 and Transform 240 are used to specify hierarchical relationships as well as specify scene, group, or individual object transformations. Note that a ModelView transform 245 is specified off of Transform node 240. This represents a concatenation of a Model transform matrix and a Viewing transform matrix into a single matrix. The ModelView transform 245 has previously been represented in 3D graphics systems such as OpenGL, which stores modeling and viewing transforms in a single matrix. This is possible because modeling and viewing operations are both affine transformations composed of rotations, scales, and translates. The only difference is the order in which they are applied to the vertices of the geometric objects to be rendered.

Exemplary embodiments of the present invention add a FIT transform 250 that is stored in the Transform node 240 and an inverse FIT transform 285 stored in the Geometry node 260. The FIT transform 250 and inverse FIT transform 285 are used to correctly transform vertex data that was originally represented by floating point values and then quantized to fixed point values. In order to preserve hierarchical relationships of objects in the scene, the FIT transformation 250 should be applied to the geometry of a geometric object as well as to any ModelView transformation matrices required for the instantiation of that geometric object.

In an exemplary implementation, the inverse FIT transforms 285 specified with the geometry nodes are comprised of a number of inverted concatenated transforms, mainly an inverted version of a quantization transform concatenated with a ModelView transform, as indicated in reference 286. The quantization transform converts a floating point space to a fixed point space. Meanwhile, the FIT transforms 250 that are stored in the Transform nodes 240 are composed of modeling and viewing transforms and quantization transforms (see reference 251 of FIG. 2) that convert a floating point space to a fixed point space. As an example, a quantization transform (used in either FITA transform 250 or inverse FIT transform 285) is typically computed at runtime from a bounding sphere radius and center (not shown) that are stored in the Transform node 240 along with MAXSHORT ($2^{15}-1$) MAXSHORT in this example is for 16-bit signed integer values. The determinations of the FIT transform 250 and the inverse FIT transform 285 are explained in further detail below.

As described previously, a scene graph 200 is typically instantiated as a directed acyclical graph, with many different nodes. When a shape node is reached, FIT transform 285 is applied to the geometry of the geometric object. Until a shape node is reached, FIT transform 250 will be calculated and updated (as will ModelView transform 245) with each Transform node 240. This allows multiple geometric objects to be transformed with a single transform, yet each geometric object can be transformed relative to the single transform. Typically, the FIT transform 250 is calculated at runtime (e.g., on the client 150), while the inverse FIT transform 285 will be stored (e.g., on the server 110) or retrieved (e.g., on the client 150).

Figure 3:
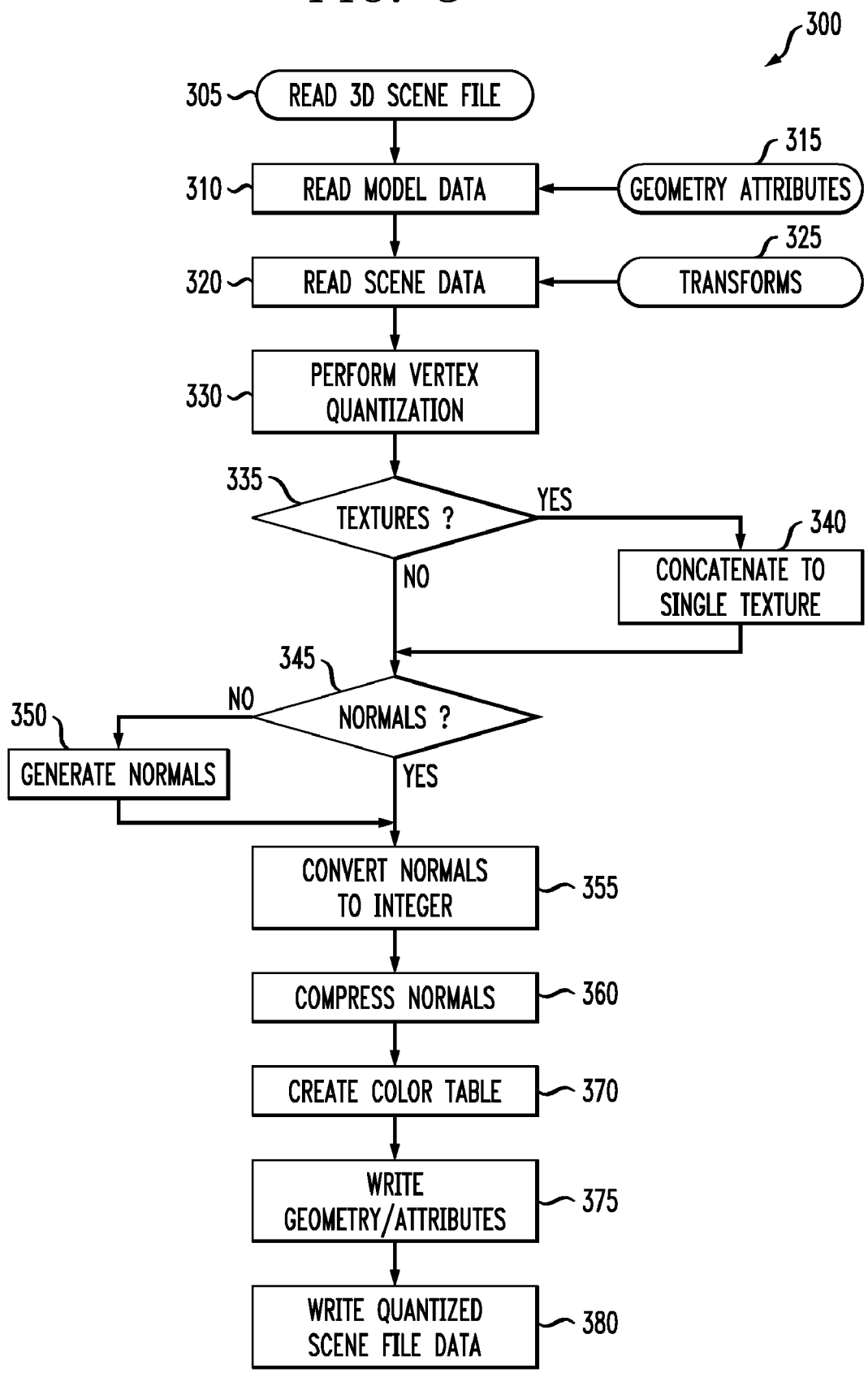
FIG. 3 is a flow chart of a method for creating quantized scene file data from three-dimensional (3D) scene files.

Turning now to FIG. 3, a method 300 is shown for creating quantized scene file data from 3D scene files. Illustratively, steps 305 through 325 could be performed by 3D scene parser 130 of FIG. 1, while steps 330 through 380 could be performed by transcoding module 135 of FIG. 1. Method 300 begins by reading a 3D scene file (step 305). The model data stored in this file is read (step 310), including all geometry attributes (reference 315). Additional scene data is processed (step 320) including modeling and viewing transformation matrices (reference 320). Vertex quantization is performed on all the vertices for the models (step 330). Vertex quantization converts floating point data to fixed point data and is explained in additional detail in reference to FIG. 4A.

In step 335, it is determined if textures are present. If textures awe present (step 335=YES), the textures are concatenated into a single texture map (step 340). Typically, textures are already in integer, but the textures are combined into a single texture map and the texture coordinates that the shapes are using to select the appropriate texel at the vertex positions from the texture are adjusted accordingly. When textures are not present (step 335=NO) or after step 340, step 345 is performed. In step 345, it is determined if normals exist. If normals exist (step 345=YES), the normals are converted from floating point data to fixed point data and compressed (steps 355 and 360). If normals do not exist (step 350=NO), the normals are generated using vertex data for each triangle (step 350) and the generated normals are converted from floating point data to fixed point data and compressed (steps 355 and 360). Color data is processed to create a color lookup table (step 370) and geometry and attributes and scene graph data are written to a new quantized scene file 180 (steps 375 and 380).

A significant part of the present invention is the quantization of floating point data into fixed point data for geometric objects. Some quantization is performed in method 300 (e.g., normals are converted to fixed point data), but FIG. 4A outlines a method 330 that quantizes vertices associated with a geometric object. For instance, as shapes from the original 3D scene file 125 are processed, the IFS data associated with each shape should be quantized. This generally happens only once per unique IFS (steps 405 and 410). As described above in reference to FIG. 2, Shape nodes 225 in the scene graph 200 contain references to Geometry objects 260 and Appearance objects 255. These references are "has a" relationships in the sense that a Shape node 225 "has a" pointer to a Geometry object 260 and a pointer to an Appearance object 255. In step 405, a Shape node 225 will be accessed, and from the Shape node 225, Geometry objects 260 will then be accessed. The Geometry objects 260 are used to stoic vertex data corresponding to a geometric object.

When a shape is encountered for the first time (step 410=Yes), a cumulative MV transform is computed (step 420) and applied (step 415) to the vertex data referenced by the IFS.

In step 430, a scene bounding sphere is determined, typically by computing the minimum x,y,z vertex and maximum x,y,z vertex values in the scene. The scene bounding sphere is determined as the smallest sphere that contains all the vertices of all the geometric objects in the scene The bounding sphere is used to compute scale and translate factors that are used to quantize the entire scene or a portion thereof from floating point space into short integer space. In an exemplary embodiment, quantization transform is determined by mapping the extents of the bounding sphere to integers between, for instance, −32,768 and +32,767. For this, the radius of the sphere, center of the sphere, and MAXSHORT are used. The quantization transform, in an exemplary embodiment, comprises three terms (e.g., x, y, z) for a scale factor, three terms (e.g., x, y, z) for a translate factor, and, if desired, four terms for a rotation factor (e g., an angle and an axis). The quantization transform thus converts a floating point space (e.g., defined by the bounding sphere) to a fixed point space. Any transform suitable for converting a floating point space to a fixed point space may be used as a quantization transform. The data in the quantization transform is typically stored as floating point data, although the data could be stored as fixed point data.

The quantization transform is used in step 435 to quantize the floating point vertex data to integer vertex data. Note that the resultant vertex data will typically be floating point data that will then be truncated or rounded to integer vertex data. In step 440, the inverse of the quantization transform is computed. In step 425, the inverse of the ModelView transform is computed. The ModelView transform and the quantization transform are concatenated and are formed into a FIT transform (typically inverse FIT transform 285 stored off of the Geometry node 260 of FIG. 2). This occurs in step 450. The inverse FIT transform 285 is stored (step 455) along with the quantized vertices (step 455) in the new quantized scene file.

It should be noted that the FIT transform 250 off of a Transform node 240 (see FIG. 2) can also be stored in the quantized scene file, if desired. The FIT transform 250 is typically a quantization transform. Alternatively, the FIT transform 250 could be computed at runtime (e.g., on a client) by using the bounding sphere radius and center that is stored in the Transform node 240 along with MAXSHORT (e.g., $2^{15}-1$), as described above.

Figure 4A:
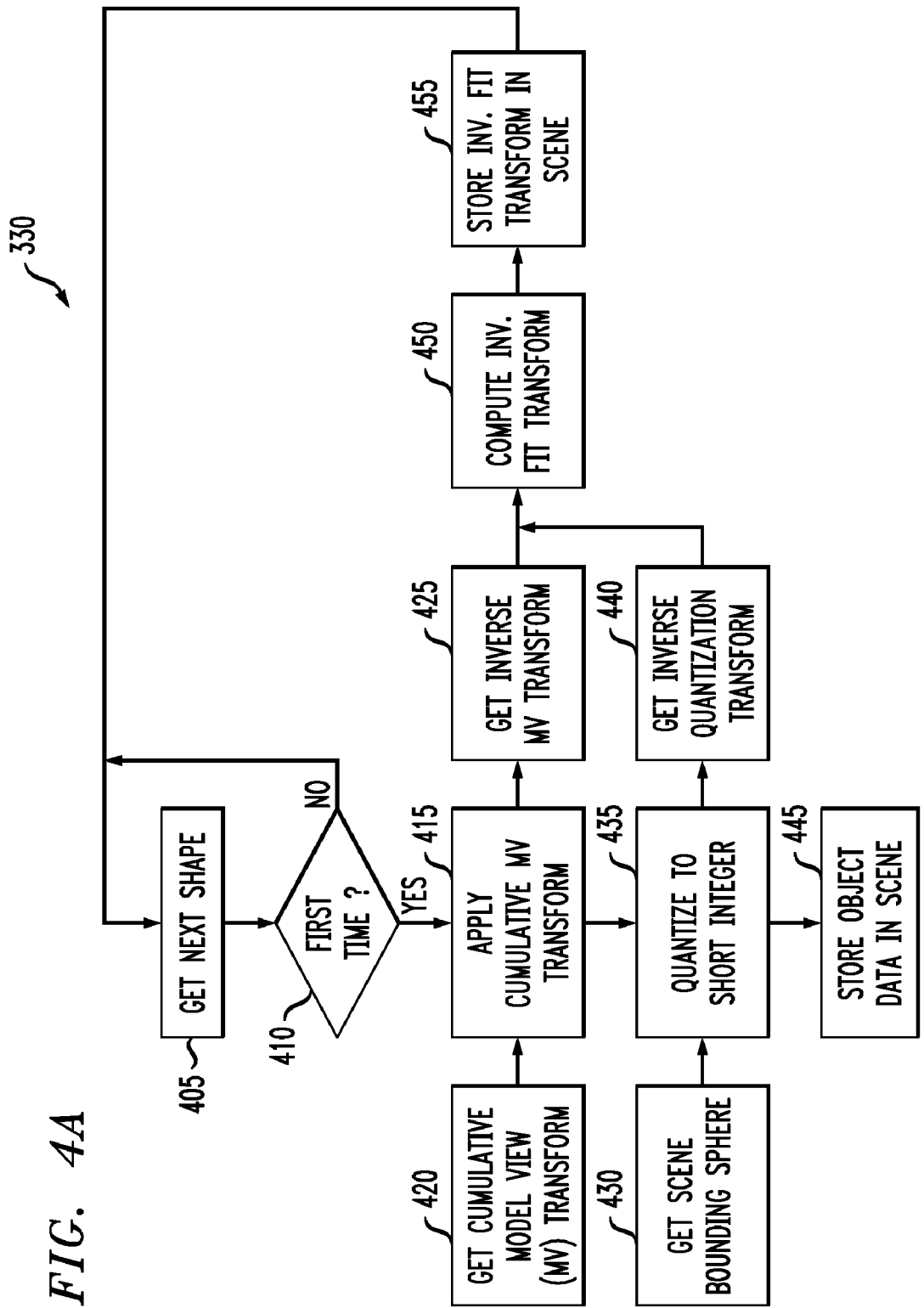
FIG. 4A is a flow chart of a method for per forming vertex quantization.

It should also be noted that FIG. 4A describes converting vertices from floating point data to fixed point data. Any data, such as points or lines, suitable for describing a geometric object may be converted from floating point data from fixed point data using method 330 of FIG. 4A

Turning now to FIG. 4B, an illustration of steps 430 and 435 of FIG. 4A is shown. In FIG. 4B, an exemplary conversion of a floating point space to a fixed point space is shown. A bounding sphere 460, such as that calculated in step 430 of FIG 4A, is a defined floating point space. Geometric object 461 exists inside the extents of the bounding sphere. "Bounding sphere" 470 is a representation in fixed point space of bounding sphere 460, where each point in the bounding sphere 460 maps to a point in "bounding sphere" 470. The bounding sphere 460 is computed using floating point numbers because the original 3D scene is all in floating point. The floating point extents of a 3D scene (e.g, defined by a sphere radius) and its center point (e.g., defined by a sphere center) are then naturally computed in floating point, but using this data one can calculate the quantization transform that is needed to convert the range of floating point data into the short integer range, e.g., (vertex(x,y,z)−spherecenter(x,y,z)) *(MAXSHORTINT−MINSHORTINT)/(2*sphere radius) =vertex(x,y,z) in short (for example) integer space. It should be noted that the bounding sphere 460 is used to determine a quantization transform, but the bounding sphere 470 is not generally determined and is used herein merely for expository purposes. Nonetheless, the floating point data within the bounding sphere 460 is converted to fixed point data via the quantization transform. For example, the geometric object 471 is a mapped version of geometric object 461. Geometric object 471 has vertices of signed integer data, while geometric object 461 has vertices of floating point data. It should be noted that the bounding sphere 460 is shown centered about the origin, but this is for illustration purposes only. Typically, translation away from the origin will also be present.

Figure 5:
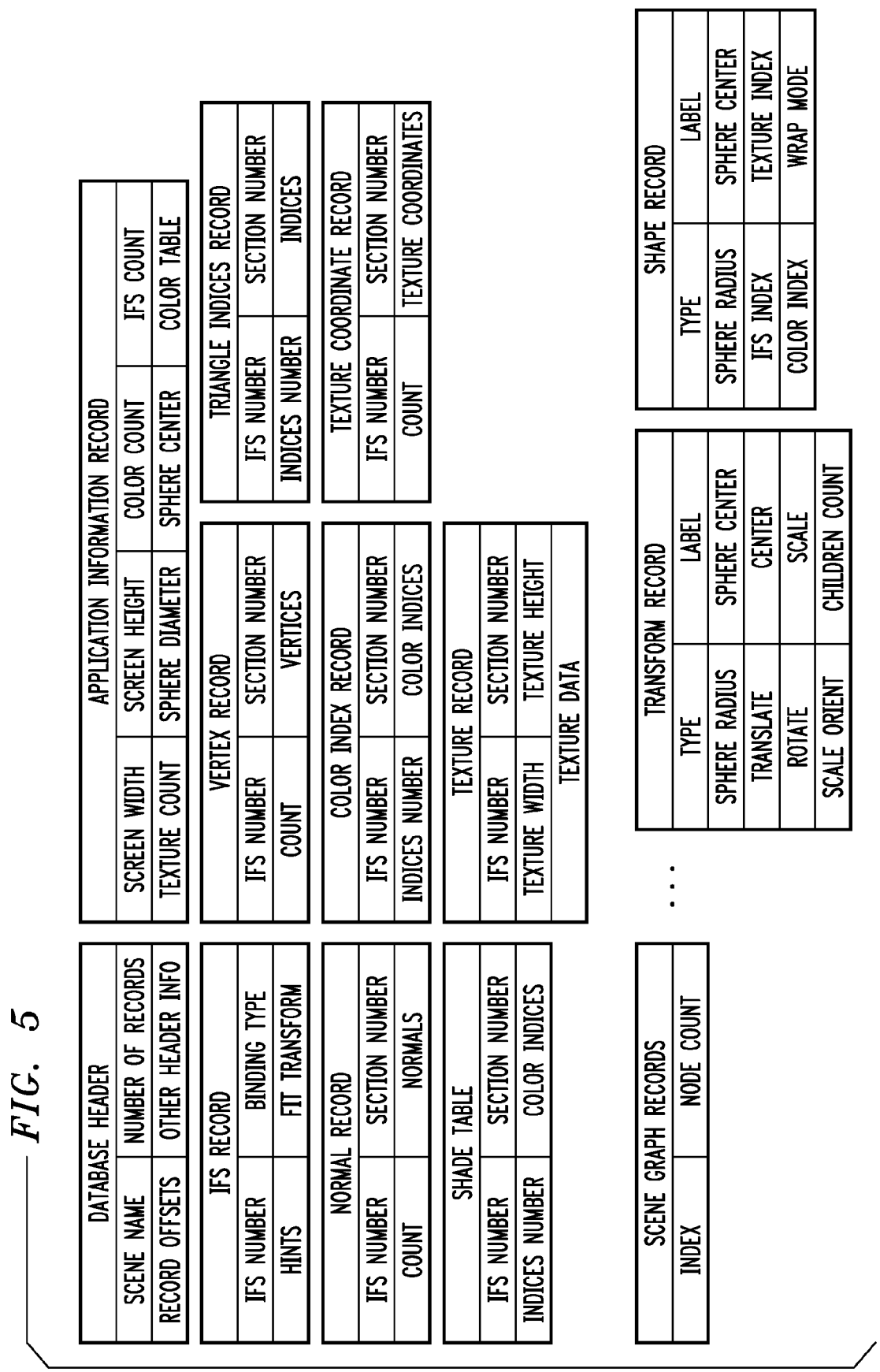
FIG. 5 is a block diagram of a portion of an exemplary quantized scene file.

The quantized scene file shown in FIG. 5 is specific to an exemplary implementation of the present invention, but other scene formats could be adapted as long as they had been properly processed by the server 110 and an appropriate parser 170 was used within a client process executing on the client device 150. This quantized scene file contains a single Database Header and an Application Information Record, but multiple IFS, Vertex, Normal, Texture Coordinate, Color Index, and Texture Records as is appropriate for the complexity of the scene. The scene Database Header contains the Scene Name, Number of Records, and Record Offsets specifying the location of each record. The Application Information Record contains the width and height dimensions (e.g., Screen Width and Screen Height, respectively) of the screen that the scene was targeted for, the number of colors used in the scene (e.g., Color Count), the number of IFS (e.g., IFS Count), the number of textures (e g., Texture Count), a Color Table, and the dimensions of the bounding sphere that would be required to encompass the entire scene (e.g., Sphere Diameter and Sphere Center).

The IFS Record contains a number signifying which IFS is being referenced (e.g., IFS Number), a Binding Type used to determine how color and texture is bound to each vertex of the triangles contained in the IFS, a Hints field that is used to determine how the IFS should be textured if texture maps are included, and an inverse FIT transformation matrix that performs an inverse transformation on fixed point data. In this example, the "Fit Transform" under the IFS Record is an example of a geometry node type that contains information for an inverse FIT transformation matrix, along with other data. The inverse FIT transformation matrix itself will typically be determined from the accumulated data stored in the Transform Records that precede the Geometry record, like Sphere Radius, Sphere Center, Translate, Center, Rotate, Scale, and Scale Orient. Alternatively, an inverse Fit transform could be stored in the Transform Record.

There can be many IFS records in a single scene with each unique geometric object requiring a different IFS record. Vertex records are associated with specific IFS records. There can be one or more vertex records per IFS and the vertex records are numbered with section numbers. This was done because an exemplary implementation of the present invention is formatted for a device that only accommodates 64 KB record lengths, so data that was larger than 64 KB needed to be broken into smaller block sizes. The vertices are typically stored as a list of short integer three-tuples (x, y, z). The Triangle Indices Record is used to store the indices into the vertex buffers that are used to lookup the three vertices of each triangle in the IFS. Each Triangle Index Record contains a reference to the associated IFS (e.g., IFS Number), a Section Number, a count (e.g., Indices Number), and the indices (e.g., Indices). The indices are stored as a list of integer three-tuples.

The Normal Record contains a list of normals for each face, vertex, or corner of each triangle in the IFS depending on the binding type specified in the IFS Record. As with the other record types, the buffer of normals required for an IFS may span several records. The normals are represented as short integers that can be compressed to save space on the client device. Normals are used to compute light intensities at each vertex, face, or coiner of the IFS. The Color Index Record contains a set of indices used to index into the Color Table that was previously included in the Application Information Record. There is one Color Table per scene in this exemplary implementation, but there is no reason why multiple color tables cannot be used. The Color Index Record is used to assign colors to each face, vertex, or corner of an IFS depending on the binding type. In conjunction with the Shade Table Record, color indices are used to provide smooth shading effects to filled triangles.

The Texture Coordinate Record stores coordinates that can be used to compute an index into the texture map contained in the Texture record. The Texture record contains the width, height and actual texture data (e.g., Texture Width, Texture Height, and Texture Data, respectively). The texture data is stored a sequence of unsigned characters. The remaining records represent the scene graph data. They are primarily Transform and Shape records.

As described above, Transform Records contain information about the bounding sphere encompassing a part of the graph, transform matrices, and number of child nodes attached to a specific Transform node. Shape Records contain bounding sphere information for the geometry represented by the IFS referenced by the shape, which texture map to use, the color index to use for the material representing the shape, and the wrap mode for texturing the shape.

FIG. 5 therefore shows that fixed point data is stored in the Vertex Records. Having the vertices be stored in fixed point format decreases the amount of floating point processing performed by a client 150 and also decreases the space required to store the vertices. Additionally, the color, texture coordinates, and normal records have all been converted to fixed point format and are stored in fixed point format.

Figure 6:
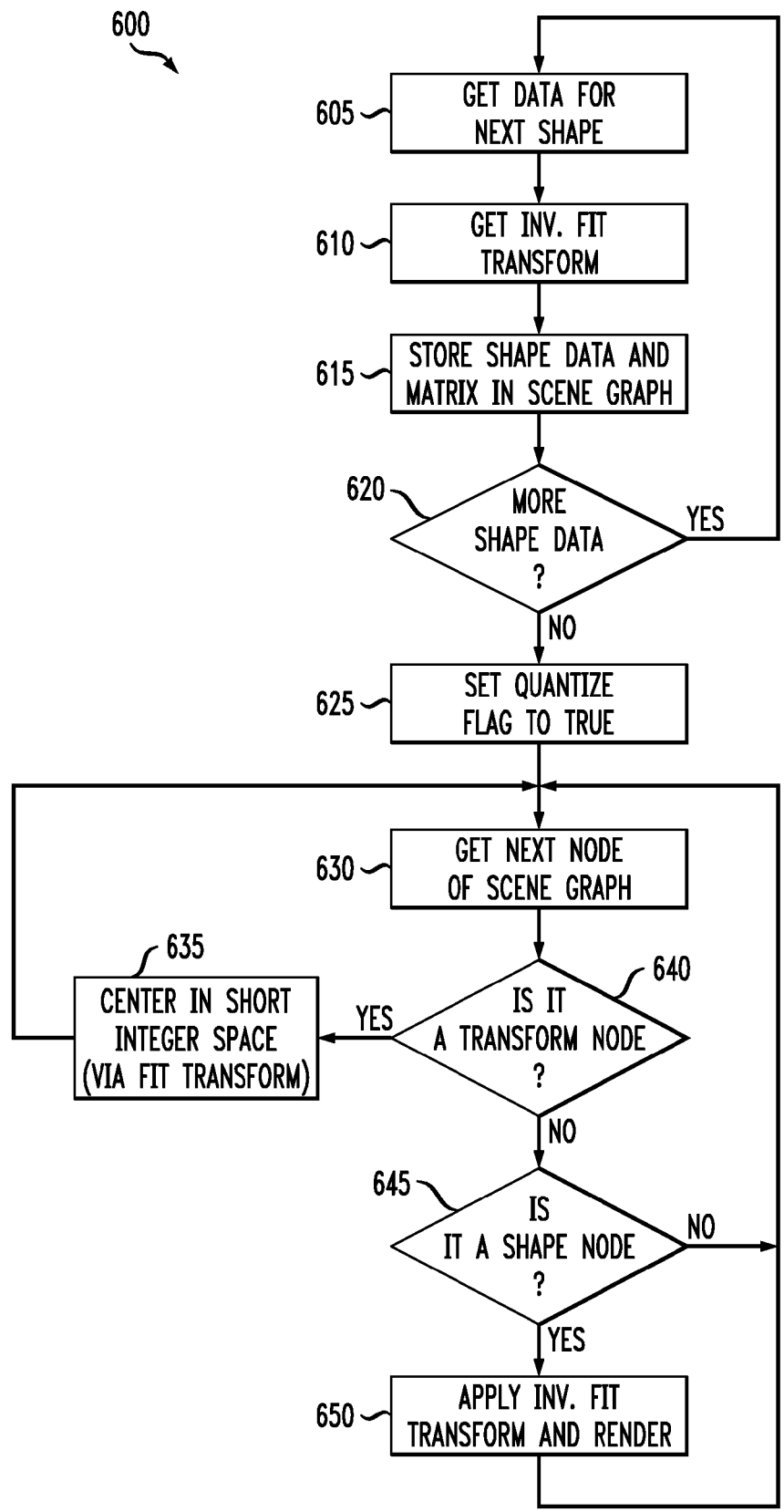
FIG. 6 is a flow chart of a method for determining and rendering quantized shape data.

FIG. 6 shows a method 600 for determining and rendering quantized shape data. Method 600 is typically performed by scene graph and video rendering module 175 of FIG. 1. Note that the quantized scene file 165 has generally already been parsed by the quantized scene parser 170 at this point.

The process begins by reading a geometric object corresponding to a shape (step 605). As explained above, Shape nodes 225 in the scene graph 200 contain references to Geometry objects 260 and a Geometry object 260 is accessed from a Shape node 225. An inverse FIT transform corresponding to the shape is lead (step 610). The inverse FIT transform read at this stage is the inverse FIT transform 285 off of the Geometry node 260 of FIG. 4A. This data is subsequently stored in a memory resident quantized scene graph 180 (see FIG. 1) on the client device 150. This occurs in step 615 This process repeats (step 620=Yes) until all shapes have been processed. Once this is complete (step 620=No), a quantize flag is set (step 625) and scene graph node processing begins (steps 630 through steps 650). Each node of the scene graph is processed until complete.

Whenever a Transform node is encountered (step 640=YES), the transform node is centered and scaled in integer space by using a FIT transform (step 635). In step 635, the FIT transform used is the FIT transform 250 off of the Transform node 240 of FIG. 2. Typically, the FIT transform 250 is determined at runtime from the bounding sphere radius and center that is stored in the Transform node 240 along with MAXSHORT (e.g., $2^{15}-1$). The FIT transform 250 is typically a quantization transform, which converts a floating point space to a fixed point space. Alternatively, the FIT transform 250 could be stored in the quantized scene file in the form of a scale plus translate matrix. A benefit to calculating the FIT transform 250 at runtime is smaller quantized scene file size, as there could be many Transform nodes 240. Also, the bounding sphere radius and center may be used for other purposes that are not consistent with matrix storage formats.

Thus, steps 640 and 635 allow a number of transforms to take place. Whenever a Shape node is encountered (step 645=Yes), an inverse FIT transform is applied to vertices of the geometric object and the shape is tendered (step 650). The inverse FIT transform applied in step 650 is the inverse FIT transform 285 of FIG. 2, which is generally an inverse of a concatenation of a quantization transform with the cumulative ModelView transform at that position in the scene graph.

In the server application (e.g., the transcoding module 135 of FIG. 1), vertex data was converted from floating point into fixed point. To do that conversion, all the ModelView transforms as well as the FIT transforms 250 were applied to the vertex data. The ModelView transforms are still maintained after their application, since they represent the hierarchy of the scene and the orientation of the objects in the scene. When the client renders a scene, the scene graph is traversed, where these ModelView transforms are specified (e.g., in the transform nodes). If the ModelView transforms are applied again to the vertex data, it would be like transforming the vertex data twice. So instead, the ModelView transforms are concatenated with the inverse FIT transforms, effectively creating an identity transform, e g., $[MV] \times [MV]^{-1}=[$Identity Matrix$]$. This is done to avoid transforming the data twice, and to preserve the original scale, rotate, translate, etc, transforms between all the geometric objects in the scene. If the user has not changed the current view, this will result in the geometry being rendered in the originally intended screen positions As the user makes viewing changes, the ModelView transforms stored in the Transform nodes are updates and the rendered geometry changes position accordingly, i.e., the ModelView transforms concatenated with the inverse FIT transforms no longer yield an identity matrix transform.

The FIT transform 250 and inverse FIT transform 285 are typically kept in floating point data, although they could be stored in integer data. A reason to keep the transforms in floating point data is that during rendering, transforms (e.g., matrices) are concatenated into a single transform (e.g., a matrix) before the they are used to transform the vertices. This includes the FIT transform 250 and inverse FIT transform 285 as well as other viewing transforms that the user may incidentally create as the use orients, scales, or moves shapes on the display. After all these transforms are concatenated into a single transform, they are converted to fixed point by multiplying each element of the transform by, for example, $2^{32}-1$. These transforms can be stored as fixed point, but then concatenation might risk integer overflow on the client 150. This is avoided by using floating point during the concatenation steps. Also, accuracy might be lost if the transformations were converted to fixed point data then concatenated.

It is to be understood that the embodiments and variations shown and described herein are merely illustrative of the principles of this invention and that various modifications may be implemented by those skilled in the art without departing from the scope and spirit of the invention.

What is claimed is:

1. A method for representing a three-dimensional scene using fixed point data, the method comprising the steps of:

determining a quantization transform corresponding to a geometric object, wherein said quantization transform is based on one or more characteristics of a scene, the geometric object representing at least a portion of the three-dimensional scene, the quantization transform useable for converting a floating point space to a fixed point space, wherein the floating point space contains one or more floating point data corresponding to the geometric object; and converting, by using the quantization transform, the one or more floating point data to one or more fixed point data, wherein one or more of said steps are performed by a processor.

2. The method of claim 1, wherein the geometric object represents at least a portion of an object in a three-dimensional scene.

3. The method of claim 1, wherein the step of converting further comprises the steps of:

multiplying the quantization transform and the one or more floating point data to create temporary data in floating point; and converting the temporary data to fixed point whole numbers.

4. The method of claim 1, wherein the step of determining a quantization transform further comprises the step of determining a bounding sphere defining extents of the floating point space represented by the geometric data in the three-dimensional scene, and wherein the one or more floating point data are contained within the bounding sphere and wherein the step of determining a quantization transform further comprises the steps of:

determining extents of the bounding sphere; and mapping the extents of the bounding sphere to data having values falling between first and second integer values.

5. The method of claim 1, wherein quantization transform comprises a scale factor and a translate factor.

6. The method of claim 1, further comprising the steps of:
computing a first transform comprising one or more of scale, rotate, and translate data;
computing an inverse of the first transform;
computing an inverse of the quantization transform;
concatenating the inverse of the quantization transform and the inverse of the first transform to create a second transform.

7. The method of claim 6, wherein the first transform is a ModelView transform or a concatenation of more than one ModelView transform.

8. The method of claim 6, further comprising the steps of:
converting one or more normals corresponding to the geometric object from floating point data to fixed point data; and
combining textures associated with the geometric object into a single texture map.

9. The method of claim 6, further comprising the steps of:
storing the one or more fixed point data in a quantized scene file; and
storing the second transform in the quantized scene file.

10. The method of claim 1, wherein the floating point data are vertices corresponding to the geometric object.

11. The method of claim 1, wherein the geometric object corresponds to a Geometry node of a scene graph.

12. An apparatus for representing a three-dimensional scene using fixed point data, the apparatus comprising:
one or more memories; and
one or more processors coupled to the one or more memories, the one or more processors configured:
to determine a quantization transform corresponding to a geometric object, wherein said quantization transform is based on one or more chart characteristics of a scene, the geometric object representing at least a portion of the three-dimensional scene, the quantization transform useable for converting a floating point space to a fixed point space, wherein the floating point space contains one or more floating point data corresponding to the geometric object; and
to convert, by using the quantization transform, the one or more floating point data to one or more fixed point data.

13. An article of manufacture for representing a three-dimensional scene using fixed point data, the article of manufacture comprising:
a computer readable medium containing one or more programs which when executed implement the steps of:
determining a quantization transform corresponding to the geometric object, wherein said quantization transform is based on one or more characteristics of a scene, the geometric object representing at least a portion of a three-dimensional scene, the quantization transform useable for converting a floating point space to a fixed point space, wherein the floating point space contains at least a portion of the three-dimensional scene; and
converting, by using the quantization transform, the one or more floating point data to one or more fixed point data.

14. A method for representing a three-dimensional scene using fixed point data, the method comprising the steps of:
determining a quantization transform corresponding to a geometric object, wherein said quantization transform is based on one or more characteristics of a scene, the geometric object representing at least a portion of the three-dimensional scene, the quantization transform suitable for converting a floating point space to a fixed point space, wherein the fixed point space contains one or more fixed point data corresponding to the geometric object and the floating point space defines at least the portion of the three-dimensional scene; and
applying at least the quantization transform to the one or more fixed point data, wherein one or more of said steps are performed by a processor.

15. The method of claim 14, wherein the step of determining a quantization transform further comprises the step of reading the quantization transform from a file, wherein the file comprises the quantization transform and the one or more fixed point data corresponding to the geometric object.

16. The method of claim 14, wherein the step of determining a quantization transform further comprises the step of determining a bounding sphere defining extents of the floating point space represented by the geometric data in the three-dimensional scene.

17. The method of claim 16, wherein the step of determining a quantization transform further comprises the steps of:
determining extents of the bounding sphere; and
mapping the extents of the bounding sphere to data having values falling between first and second integer values.

18. The method of claim 17, wherein the step of determining extents of the bounding sphere further comprises the step of computing at least one minimum vertex value and at least one maximum vertex value for all geometric objects in at least the portion of the three-dimensional scene.

19. The method of claim 17, wherein the step of mapping uses a radius of the bounding sphere, a center of the bounding sphere, and maximum and minimum short integer values.

20. An apparatus for representing a three-dimensional scene using fixed point data, the apparatus comprising:
one or more memories; and
one or more processors coupled to the one or more memories, the one or more processors configured:
to determine a quantization transform corresponding to a geometric object, wherein said quantization transform is based on one or more characteristics of a scene, the geometric object representing at least a portion of the three-dimensional scene, the quantization transform suitable for converting a floating point space to a fixed point space, wherein the fixed point space contains one or more fixed point data corresponding to the geometric object and the floating point space defines at least the portion of the three-dimensional scene; and
to apply at least the quantization transform to the one or more fixed point data.

* * * * *